US012558668B2

(12) United States Patent
Butterworth

(10) Patent No.: US 12,558,668 B2
(45) Date of Patent: Feb. 24, 2026

(54) VAPOR ADSORBENT FOR ENCLOSED VOLUMES

(71) Applicant: CALGON CARBON CORPORATION, Moon Township, PA (US)

(72) Inventor: Steven L. Butterworth, Moon Township, PA (US)

(73) Assignee: CALGON CARBON CORPORATION, Moon Township, PA (US)

( * ) Notice: Subject to any disclaimer, the term of this patent is extended or adjusted under 35 U.S.C. 154(b) by 369 days.

(21) Appl. No.: 18/060,682

(22) Filed: Dec. 1, 2022

(65) Prior Publication Data

US 2023/0166235 A1     Jun. 1, 2023

Related U.S. Application Data

(60) Provisional application No. 63/264,759, filed on Dec. 1, 2021.

(51) Int. Cl.
*B01J 20/20*     (2006.01)
*A61G 17/06*     (2006.01)
*B01D 53/04*     (2006.01)
*B01J 20/26*     (2006.01)
*B01J 20/28*     (2006.01)

(52) U.S. Cl.
CPC .............. *B01J 20/20* (2013.01); *A61G 17/06* (2013.01); *B01D 53/0407* (2013.01); *B01J 20/261* (2013.01); *B01J 20/2803* (2013.01); *B01J 20/28035* (2013.01); *B01J 20/2805*

(2013.01); *B01D 2253/102* (2013.01); *B01D 2253/25* (2013.01); *B01D 2257/7022* (2013.01); *B01D 2259/4525* (2013.01)

(58) Field of Classification Search
CPC . B01D 53/04; B01J 20/20; B01J 20/26; B01J 20/28
See application file for complete search history.

(56) References Cited

U.S. PATENT DOCUMENTS

| | | | |
|---|---|---|---|
| 3,964,140 A | 6/1976 | Gauchard | |
| 5,216,789 A | 6/1993 | Pomares et al. | |
| 5,876,487 A | 3/1999 | Dahlgren et al. | |
| 7,077,891 B2 * | 7/2006 | Jaffe | B01J 20/3042 96/135 |
| 11,697,090 B2 * | 7/2023 | Greenbank | B60K 15/03504 96/153 |
| 2005/0138783 A1 * | 6/2005 | Craig | A61G 17/06 27/28 |
| 2011/0256392 A1 | 10/2011 | Takanashi | |
| 2017/0360558 A1 | 12/2017 | Ma | |

(Continued)

FOREIGN PATENT DOCUMENTS

JP          2021029936 A          3/2021

*Primary Examiner* — Sharon Pregler
(74) *Attorney, Agent, or Firm* — DLA Piper LLP (US)

(57) ABSTRACT

Sorbent material sheets are attached to an inner surface of an article having an enclosed volume, such as a cadaver pouch, an ammunition storage container, or a film or video tape storage box. The sorbent material sheets adsorb vapors which are released by the contents of the enclosed volumes, while providing flexibility and without releasing particles which could contaminate the contents of the enclosed volume.

12 Claims, 3 Drawing Sheets

(56) References Cited

U.S. PATENT DOCUMENTS

| | | |
|---|---|---|
| 2019/0046919 A1 | 2/2019 | Liu et al. |
| 2020/0038798 A1 | 2/2020 | Greenbank et al. |
| 2020/0040851 A1 | 2/2020 | Greenbank et al. |
| 2021/0039037 A1 | 2/2021 | Greenbank et al. |

* cited by examiner

VAPOR ADSORBENT FOR ENCLOSED VOLUMES

CROSS REFERENCE TO RELATED APPLICATIONS

This application claims priority to U.S. Provisional Application No. 63/264,759, filed Dec. 1, 2021, which is hereby incorporated by reference in its entirety.

BACKGROUND

There are situations where the ventilation of articles having enclosed volumes is not possible or practical. The enclosed volume that is part of the article might be difficult to ventilate or may be specifically designed to avoid ingress or egress of fluids contained therein. Especially when the fluid is a gas, it may be imperative that the fluid remain within the enclosed volume.

For example, there are often gases released by the contents of the enclosed volumes which must be removed. The gases may be toxic, can further degrade the contents of the enclosed volumes, or may have other undesirable aspects such as odors. Some such articles include cadaver pouch for contaminated remains, munitions and explosives storage cases, and articles that are configured for storage of photographic film and magnetic data tapes. Conventional methods of removing the gases include contacting the gases with a carbon cloth material or a granular activated carbon material. However, both of these available solutions present certain problems.

One technique for removing vapors is by contacting the gases with a sorbent such as activated carbon, thereby removing the gases from the article having an enclosed volume. For example, activated carbon can be made in the form of a cloth and applied to an inside wall or other internal surface of the article having an enclosed volume. However, carbon cloth is sometimes expensive to manufacture and install. Stitching the cloth to the walls of the article having an enclosed volume is possible, but could interfere with proper sealing. Further problems with the use of a carbon cloth include the high cost of the material and the potential risk of fibers from the cloth being shed and contaminating the contents of the article having an enclosed volume. A drawback of using a granular activated carbon is the handling of the granular media upon the opening of the article having an enclosed volume and during the removal of the contents of the article having an enclosed volume. Additionally, there is a risk of the granular activated carbon becoming embedded in the contents of the article having an enclosed volume and contaminating the contents. There is a need for an improved method of removing vapors which are released within articles having one or more enclosed volumes.

SUMMARY

In some aspects, the techniques described herein relate to a method of adsorbing vapors in an article having an enclosed volume including: providing in the enclosed volume a sorbent material sheet product, and contacting the vapors with the sorbent material sheet product, wherein the sorbent material sheet product includes: a sorbent material and a binder that holds the sorbent material in place.

In some aspects, the techniques described herein relate to a method 1, wherein the sorbent material is selected from the group consisting of activated carbon, carbon nanotubes, graphenes, natural and synthetic zeolite, silica, silica gel, alumina, zirconia, diatomaceous earths, and combinations thereof.

In some aspects, the techniques described herein relate to a method 1, wherein the binder includes one or more of polytetrafluoroethylenes (PTFE or TEFLON), polyvinyl fluorides or polyvinylidene fluorides (PVF or $PVF_2$ or PVDF), ethylene-propylene-diene (EPDM) rubbers, polyethylene oxides (PEO), UV curable acrylates, UV curable methacrylates, heat curable divinyl ethers, polybutylene terephthalate, acetal or polyoxymethylene resin, fluoroelastomers, perfluoroelastomers (FFKM) and/or tetrafluoro ethylene/propylene rubbers (FEPM), aramid polymers, para-aramid polymers, meta-aramid polymers, poly trimethylene terephthalate, ethylene acrylic elastomers, polyimide, polyamide-imides, polyurethanes, low density and high density polyethylene, polypropylene, biaxially oriented polypropylene (BoPP), polyethylene terephthalate (PET), biaxially oriented polyethylene terephthale (BoPET), polychloroprene, or copolymers or combinations thereof.

In some aspects, the techniques described herein relate to a method 3, wherein the binder is hydrophobic.

In some aspects, the techniques described herein relate to a method 1, wherein the sorbent material sheet product is flexible.

In some aspects, the techniques described herein relate to a method 1, wherein the sorbent material sheet product further includes one or more polymeric scrims laminated to a surface of the sorbent material and the binder.

In some aspects, the techniques described herein relate to a method 6, wherein the one or more polymeric scrims allow the sorbent material sheet product to be welded with one or more plastics.

In some aspects, the techniques described herein relate to a method 6, wherein the one or more polymeric scrims allow the sorbent material sheet product to be sewn together.

In some aspects, the techniques described herein relate to a method 1, wherein the sorbent material sheet product contains perforations allowing fluids to pass through the sorbent material into an adsorbent layer.

In some aspects, the techniques described herein relate to a method 1, wherein the sorbent material is present on a surface of the sorbent material sheet product.

In some aspects, the techniques described herein relate to a method 1, wherein the article having an enclosed volume is one of a cadaver pouch, a box containing film, a box containing video tapes, or a box containing ammunition.

In some aspects, the techniques described herein relate to a method 11, wherein the article having an enclosed volume is a cadaver pouch that contains a cadaver or a part of a cadaver that is contaminated with at least one contaminant substance.

In some aspects, the techniques described herein relate to a method 11, wherein the article having an enclosed volume is a cadaver pouch that contains a cadaver or a part of a cadaver that is suspected of being contaminated with at least one contaminant substance.

In some aspects, the techniques described herein relate to a method 1, wherein the binder is fibrillated.

DRAWINGS

Aspects, features, benefits, and advantages of the embodiments described herein will be apparent with regard to the following description, appended claims, and accompanying drawings where:

US 12,558,668 B2

3

DETAILED DESCRIPTION

Figure 1:
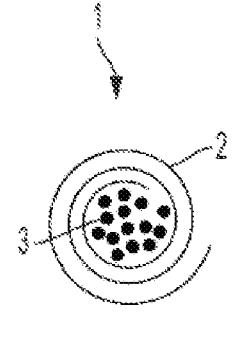
FIG. 1 depicts one embodiment of the invention utilizing a sorbent core.

Before the present compositions and methods are described, it is to be understood that the scope of the invention is not limited to the particular processes, compositions, or methodologies described, as these may vary. It is also to be understood that the terminology used in the description is for the purpose of describing the particular versions or embodiments only, and is not intended to limit the scope of the present invention which will be limited only by the appended claims. Unless defined otherwise, all technical and scientific terms used herein have the same meanings as commonly understood by one of ordinary skill in the art. Although any methods and materials similar or equivalent to those described herein can be used in the practice or testing of embodiments of the present invention, the preferred methods, devices, and materials are now described. All publications mentioned herein are incorporated by reference with respect to the aspect it is identified as describing. Nothing herein is to be construed as an admission that the invention is not entitled to antedate such disclosure by virtue of prior invention.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

As used herein, the term "about" means plus or minus 10% of the numerical value of the number with which it is being used. For example, "about 50%" means in the range of 45-55%.

As used herein, the term "sorbent material" is meant to encompass all known materials from any source that are capable of adsorbing liquids and/or gases. For example, sorbent materials include, but are not limited to, activated carbon, carbon nanotubes, graphenes, natural and synthetic zeolite, silica, silica gel, alumina, zirconia, and diatomaceous earths.

The disclosure of U.S. Patent Application Publication No. 2021/0039037 entitled "Sorbent Devices for Air Intakes" is incorporated by reference herein in its entirety.

As used herein, descriptions and claims of multiple sorbent material sheets mean that there are multiple, separated sheets, with sides and/or surfaces in proximity to each other. Alternatively, descriptions and claims of multiple sorbent material sheets mean that there is only a single sheet, but that it has been wound or folded over on itself to yield a stacked, wound, or otherwise constructed mass of sheets with sides and/or surfaces in proximity to each other. The term also envisions that multiple sheets are stacked together and then wound or otherwise folded over, forming alternating layers in a single mass.

As used in the context of the sorbent or sorbent material or sorbent material sheets, the term surface means the outer boundary of that individual component. Even more specifically, in the context of the sorbent material sheets, the term surface means the largest planar faces of the sheets, which when rolled or stacked face each other or themselves. In a sheet, the surface is the portion that is significantly larger than the thickness of the sheet.

Embodiments of the invention are directed to devices containing one or more sheets of sorbent material, sorbent material sheets, and methods for making sorbent material sheets and devices containing these sheets. In various embodiments, the sorbent material sheets may be composed of a sorbent material and a binder and have a thickness of less than about 2 mm, or less than about 1 mm. The devices of various embodiments may include a housing and one or more sorbent material sheets. In some embodiments, the devices may have a void fraction of about 10% or more of the total volume of the housing.

A sheet form of activated carbon can be produced with sorbent materials such as activated carbon contents of about 80% to about 90% or more by weight by use of binders, for example fibrillating binders. Fibrillating binders are those that have been fibrillated in order to hold the sorbent materials together in the form of a sheet or other body. Furthermore, the activated carbon is not fouled (that is, its pores are not blocked and its capacity is not reduced) by said binder, thereby affording far greater capacity and faster kinetics vs. the use of traditional paper making technology. The flexibility of the sheet allows for very wide design flexibility, allowing flow-through as well as flow-by designs of varying pressure drop and capacity as needed. Exemplary sheets are described below. Said sheets are amenable to: being laminated with a variety of other materials that will not bind the sheet, that facilitate attachment of the sheet within the manifold (for example, by sonic welding or heat-staking), and that eliminate any concerns about fugitive dust.

The Sorbent Material Sheets

The sorbent material sheets of the invention may include any of the sorbent materials described above including, but are not limited to, activated carbon, carbon nanotubes, graphenes, natural and synthetic zeolite, silica, silica gel, alumina, zirconia, and diatomaceous earths, and in certain embodiments, the sorbent material sheets may be composed of activated carbon. The sorbents may be used alone or in combination.

The activated carbon may be of various grades and types selected based on performance requirements, cost, and other considerations. The activated carbon may be granular from reagglomerating a powder, granular from crushing or sizing nutshells, wood, coal or pellets created by extrusion, or activated carbon in powdered form. The activated carbon may be formed by processes of carbonization and activated. The raw material, such as wood, nutshell, coal, pitch, etc. is oxidized and devolatized, with steam and/or carbon dioxide gasified to form the pore structure in the activated carbon which is useful for adsorption. The initial oxidation and devolatilization process may include a chemical treatment with a dehydrating chemical, such as phosphoric acid, sulfuric acid, sodium hydroxide, potassium hydroxide, and combinations of those.

A variety of activation processes are known in the art. The most useful processes for providing activated carbon for the sorbent material sheets of the claimed invention involve a step of providing wood and/or wood byproduct, acid treating the wood and/or wood byproducts by exposure to phosphoric acid, and carbonizing the wood and/or wood byproducts using steam and/or carbon dioxide gasification. This process results in activated carbon particles having the highest butane working capacity ("BWC"), which is a measure of activated carbon performance.

The activated carbon may be formed from materials including bagasse, bamboo, coconut husks, peat, wood such as hardwood and softwood sources in the form of sawdust and scrap, lignite, synthetic polymers, coal and coal tar, petroleum pitch, asphalt and bitumen, corn stalks and husks, wheat straw, spent grains, rice hulls and husks, nutshells, and combinations thereof.

The sorbent material sheets may further include one or more binders. Embodiments are not limited to particular binders, which can include polytetrafluoroethylenes (PTFE or TEFLON), polyvinyl fluorides or polyvinylidene fluorides (PVF or $PVF_2$ or PVDF), ethylene-propylene-diene (EPDM) rubbers, polyethylene oxides (PEO), UV curable acrylates, UV curable methacrylates, heat curable divinyl ethers, polybutylene terephthalate, acetal or polyoxymethylene resin, fluoroelastomers such as perfluoroelastomers (FFKM) and tetrafluoro ethylene/propylene rubbers (FEPM), aramid polymers such as para-aramid and meta-aramid polymers, poly trimethylene terephthalate, ethylene acrylic elastomers, polyimide, polyamide-imides, polyurethanes, low density and high density polyethylene, polypropylene, biaxially oriented polypropylene (BoPP), polyethylene terephthalate (PET), biaxially oriented polyethylene terephthalate (BoPET), polychloroprene, and copolymers and combinations thereof. The binders can be thermoplastic or thermosetting as conditions require, and can include mixtures of thermoplastic and thermosetting compounds.

The amount of binder may be about 1% to about 30% by weight of the total composition, and in certain embodiments, the amount of binder may be about 1% to about 20% by weight or about 2% to about 10% by weight of the total composition, or any individual amount or range encompassing these example amounts. The binder may be present in the amount of about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20% or any range made of any two or more of the above amounts, all of which are measured by weight of the total composition. In some embodiments, the sorbent material sheets may include a solvent, which may generally be present in small, residual, amounts of, for example, less than 10%, less than 5%, or less than 2% and greater than about 0.1% or 0.2% by weight. In particular, in some embodiments the sorbent material sheets may have no (0%) solvent.

In some embodiments, the sorbent material sheets have a thickness of less than about 2 mm, less than about 1.8 mm, less than about 1.6 mm, less than about 1.4 mm, less than about 1.2 mm, less than about 1.0 mm, about 0.01 mm to about 2 mm, about 0.01 mm to about 1.8 mm, about 0.1 mm to about 1.6 mm, about 0.01 mm to about 1.4 mm, about 0.01 mm to about 1.2 mm, about 0.01 mm to about 1.0 mm, about 0.02 mm to about 0.90 mm, about 0.05 to about 0.95 mm, about 0.05 to about 0.90 mm or any individual thickness or range encompassed by these example ranges. The sorbent material sheets of various embodiments may have a density of about 0.05 $g/cm^3$ to about 2.0 $g/cm^3$, and in other embodiments, the sorbent material sheets may have a density of 0.08 $g/cm^3$ to about 1.5 $g/cm^3$, about 0.1 $g/cm^3$ to about 1.3 $g/cm^3$, or any density or range encompassed by these example ranges. The density is calculated first by measuring the thickness of a given square or circular piece of sheet with a micrometer, multiplying by the surface area to obtain the volume, and weighing the piece to obtain the density (weight/volume).

The BWC for each sorbent material sheet may be greater than about 10 $g/100$ $cm^3$, and in some embodiments, the BWC may be from about 7.0 $g/100$ $cm^3$ to about 30 $g/100$ $cm^3$, about 8.0 $g/100$ $cm^3$ to about 25 $g/100$ $cm^3$, about 10 $g/100$ $cm^3$ to about 20 $g/100$ $cm^3$, about 10 $g/100$ $cm^3$ to about 15 $g/100$ $cm^3$, about 11 $g/100$ $cm^3$ to about 15 $g/100$ $cm^3$, about 12 $g/100$ $cm^3$ to about 15 $g/100$ $cm^3$ or any individual BWC or range encompassed by these example ranges. In other examples, the BWC may be about 9 $g/100$ $cm^3$ to about 15 $g/100$ $cm^3$, about 12 $g/100$ $cm^3$ to about 20 $g/100$ $cm^3$, about 13 $g/100$ $cm^3$ to about 20 $g/100$ $cm^3$, about 14 $g/100$ $cm^3$3 to about 20 $g/100$ $cm^3$, or about 15 $g/100$ $cm^3$ to about 20 $g/100$ $cm^3$. It is also contemplated that any of the endpoints of the above ranges may be combined to form new and distinct ranges.

As was discussed above, butane working capacity (BWC) is a measure of the performance of activated carbon. BWC is determined for a sample by measuring the ability of the activated carbon to adsorb and desorb butane from dry air under specified conditions, and measures the difference between the butane adsorbed at saturated and the butane retained per unit volume of carbon after a specified purge. BWC can be tested in several ways, including procedures specified by ASTM International and which are known to those of skill in the art. Specifically, testing can follow ASTM D5228, which includes revisions D5228-16, D5228-92 (2015), D5228-92 (2005), and D5228-92 (2000).

The sorbent material sheets of the present invention have higher performance as measured by the BWC than conventional sorbent materials which are provided in powders, particular forms, papers, pleated filters, and other forms.

The sorbent material sheets of embodiments can be made by any suitable process. In some embodiments, sorbent material sheets can be made by pulverizing granular or pelletized sorbent material to a powder, mixing the powder with a binder to form a mixture, heating and blending the mixture, and rolling the mixture to form the sorbent material sheet. The step of pulverizing may produce sorbent particles having an average particle diameter of about 0.001 mm to about 0.2 mm, about 0.005 mm to about 0.1 mm, about 0.01 mm to about 0.075 mm, or any individual particle diameter or range encompassed by these example ranges, and in certain embodiments, the pulverized sorbent particles may have an average particle diameter of about 0.001 mm to about 0.01 mm. The step of mixing the powder with a binder may include mixing the sorbent particle powder with about 2% to about 20% by weight or about 2% to about 10% by weight of the total composition, or any individual amount or range encompassed by these example ranges. Heating can be carried out at any temperature sufficient to remove residual solvent such as, for example, about 50° C. to about 200° C.

The sorbent material sheet of the invention may include various distributions of different sized particles to increase the packing efficiency of the powder within the sorbent material sheets. The selection of different sized particles can also improve rheological properties of the powder and surrounding binders, which allows improved mixing and uniform particle distribution before formation of the sorbent material sheets. In some embodiments, the particles of the sorbent material sheet may have a single particle size distribution, and in other embodiments, the particles may have two different particle size distributions. In further embodiments, the particle may have at least three different particle size distributions.

The mean particle sizes of at least two different particle populations, each having a particular size distribution, may be selected so that they have a ratio of between about 1:1 and about 1:15: In other embodiments, the mean particle sizes of the two different particle populations may have a ratio of about 1:2 to about 1:10. The mean particle sizes may also have a ratio of about 1:2 to about 1:5, or combinations of any of the above listed ratios.

The sorbent material sheets may be configured together in a variety of ways depending on the physical space that they must conform to, the required device performance, and the features which are included in proximity to the sheets. In some embodiments, the sheets may be corrugated, include folds, and/or include holes or apertures to increase the surface area of the sorbent material sheets that is exposed to the passing fluid, therefore increasing performance for a given total sheet surface area. The various corrugations, folds, holes, and apertures can also be sized and placed to make way for internal and external features, such as fluid channels, tubing, sensors, and valves. The folds of the sorbent material sheets may take a variety of forms, such as a spiral wrapped configuration in either a cylindrical or elliptical form. The folds may also be in the form of an "S" shape, or a convex or concave "C" shape depending on the required device dimensions and/or any other required internal or external features. The sorbent material sheets may also be stacked in a flat or curved configuration, and the stacked sheets may be square, rectangular, circular, oval, or other irregular shape as needed to fit the space intended. This, in combination with the housing features discussed below, enables devices formed from the sorbent material sheets to fit within the confines of an article having an enclosed volume, such as a cadaver pouch.

In addition to the above described configurations, the sorbent material sheets may also have surface features. In some embodiments, the sorbent material sheets may include raised portions, and in other embodiments, the sorbent material sheets may include depressed portions. These surface features may be combined within the same sheet. The inclusion of raised and/or depressed portions in the sheets may be utilized to form various configurations between the sheets as they are stacked, wrapped, and so forth. For instance, the sheets can be aligned so that the raised and/or depressed portions nest with each other, which brings the adjacent sheets closer together. The sheets can also be aligned so that the raised and/or depressed portions do not nest with each other, which forms a gap between the adjacent sheets. The alignment can be used to form various open and closed channels for vapor adsorption between the sheets.

Carbon sheet performance can be improved by the addition of materials prior to or during sheet processing. These materials provide beneficial properties such as enhanced porosity or adsorption of inorganic gases such as $H_2S$ or other volatile gases. Alternatively, different sorbent materials can be processed simultaneously into a single sheet with distinct sections or a performance gradient from one side of the sheet to the other.

Examples of additives that provide porosity include, but are not limited to, foam-like polymer additives; water-soluble polymers, which could be rinsed to leave behind pores; friable materials with particle size greater than the intended sheet thickness, which would break up and leave behind pores, materials that are thermally labile so that the sheet can be heated and the added materials vaporize, producing pores in the sheets, and other similar processes that could impart a controlled porosity within the sorbent sheets. Any of these may be used alone or in combination.

An alternative enhancement to sorbent sheet production is to process sorbent sheets such that two or more sorbents with different properties are included in a single sheet but are segregated along the width of the sheet. For example, a high BWC sorbent could be used in the same sheet with a low BWC sorbent, such that the gases in the enclosed volume contact the high BWC sorbent ahead of the low BWC sorbent, within a single chamber. That is, in some embodiments, low and high BWC sorbents could be homogeneously mixed, or in some embodiments, there could be distinct sections of low or high BWC sorbents as desired.

Another example is a high BWC sorbent for adsorption of butane, included with a sorbent that would remove $H_2S$ or other undesirable gases that are not normally well removed by a high BWC activated carbon, for example.

Sorbent Material Sheet Product

In certain embodiments, sorbent material sheet (such as Calgon Carbon's CALFLEX) is produced as described above and laminated or otherwise attached to a backing sheet in order to form a sorbent material sheet product. The backing sheet is not limited and can be any polymer material that is capable of supporting the sorbent material sheet while enabling the overall sorbent material sheet product to be fixed to various components in an article having an enclosed volume.

The sorbent material sheets described above are combined into a sorbent material sheet product. The combination of the sorbent material sheets takes advantage of one or more of the above described features, such as increased surface area/volume ratio, reduced void space, improved sorbent performance, etc. In general, the individual sorbent material sheets are arranged next to each other to form a sorbent material sheet product that comprises sheets that are stacked, rolled, wound, folded, and/or laminated such that the surfaces of the sorbent material sheets are in close proximity to, or adjacent to each other. Whatever the arrangement, the goal is to maximize the surface area of the sheets exposed to the vapor, fluid, and/or gas stream and thus the performance of the sorbent material sheets.

In some embodiments, the backing sheet is formed of polyethylene, polypropylene, polytetrafluoroethylene (PTFE or TEFLON), polyvinyl or polyvinylidene fluorides (PVF or $PVF_2$ or PVDF), ethylene-propylene-diene (EPDM) rubbers, polyethylene oxides (PEO), UV curable acrylates, UV curable methacrylates, heat curable divinyl ethers, polybutylene terephthalate, acetal or polyoxymethylene resin, fluoroelastomers, perfluoroelastomers (FFKM) and/or tetrafluoro ethylene/propylene rubbers (FEPM), aramid polymers, para-aramid polymers, meta-aramid polymers, poly trimethylene terephthalate, ethylene acrylic elastomers, polyimide, polyamide-imides, polyurethanes, low density and high density polyethylene, polypropylene, biaxially oriented polypropylene (BoPP), polyethylene terephthalate (PET), biaxially oriented polyethylene terephthalate (BoPET), polychloroprene, and copolymers and combinations thereof.

The backing sheet may have any structure, including an extruded sheet, non-woven sheet, woven sheet, cast sheet, injection molded sheet, and combinations thereof.

In some embodiments, the backing sheet is formed of the same material as the binder of the sorbent material sheet. In other embodiments, the backing material is formed of a different material than the binder of the sorbent material sheet.

The structure and methods of attaching the sorbent material sheet to the backing sheet to form the sorbent material sheet product is not particularly limited. In some embodiments, the sorbent material sheet is laminated by passing the sorbent material sheet and the backing sheet through a roll mill. In other embodiments, the sorbent material sheet and the backing sheet are coextruded from a single extrusion die. In other embodiments, the sorbent material sheet and the backing sheet are bonded by at least one layer of adhesive or by the surface energy of at least one of the sorbent material sheets or the backing sheet. In some embodiments, the sorbent material sheet and the backing sheet are bonded together by positioning a double-sided adhesive substrate between the sorbent material sheet and the backing sheet. In still further embodiments, the sorbent material sheet and the backing sheet are attached by sonic welding or mechanical fasteners including staples, screws, nails, clamps, tabs, or posts. In some embodiments, a backing sheet may be provided on either side of a sorbent material sheet. Similarly, in some embodiments, separate sorbent material sheets may be placed on either side of a backing sheet. In still other embodiments, multiple alternating layers of sorbent material sheets and backing sheets may be employed.

In some embodiments, the backing sheet is omitted entirely and the sorbent material sheet product can itself be used directly, either alone or with a fastener or adhesive backing. In one embodiment, the sorbent material sheet product comprises a sorbent material sheet with an adhesive on one side for fastening directly to the walls of an article having an enclosed volume. In such embodiments, the sorbent material sheet product may be provided with a release liner to protect the adhesive before application to the article having an enclosed volume.

In some embodiments, the sorbent sheet product is rolled, and the rolled sorbent sheet product has a BWC at least 10% higher than the BWC of a pelletized/powdered form of the same amount by volume of the sorbent material in the sorbent sheet. The rolled sorbent sheet product has a BWC greater than about 10 g/100 cm$^3$. The rolled sorbent sheet product has a BWC of about 7.0 g/100 cm$^3$ to about 30 g/100 cm$^3$, or greater than about 12 g/100 cm$^3$, or greater than about 13 g/100 cm$^3$, or greater than about 14 g/100 cm$^3$, or greater than about 15 g/100 cm$^3$, or greater than 20 g/100 cm$^3$. Ranges are also contemplated, such as about 10-20 g/cm$^3$, about 10-12 g/cm$^3$, about 10-14 g/cm$^3$, about 12-14 g/cm$^3$, about 12-15 g/cm$^3$, and about 15-20 g/cm$^3$.

A rolled sorbent sheet product as described herein has a generally cylindrical shape having a length substantially greater than its diameter, although any dimension can be employed, including conical, or frustro-conical variations, as well as ellipsoids, or other shapes.

The density of the rolled sorbent sheet product may be computed based on the formulas below:

| Roll Density Calculations (US units) |
|---|
| $$\rho\left(\frac{lb}{ft^3}\right) = (3) * \frac{BW * L}{\left(\frac{OD^2}{4} - \frac{ID^2}{4}\right) * \pi}$$ |

| | |
|---|---|
| BW: Basis Weight$\left(\frac{oz}{yd^2}\right)$ | L: Length on Roll (yd) |
| OD: Outer Roll Diameter (in) | ID: Inner Roll Diameter/Core Diameter (in) |
| W: Machine width or roll length (in) | $\rho$: Roll Density$\left(\frac{lb}{ft^3}\right)$ |

| Roll Density Calculations (SI units) |
|---|
| $$\rho\left(\frac{kg}{m^3}\right) = (1000) * \frac{BW * L}{\left(\frac{OD^2}{4} - \frac{ID^2}{4}\right) * \pi}$$ |

| | |
|---|---|
| BW: Basis Weight$\left(\frac{g}{m^2}\right)$ | L: Length on Roll (m) |
| OD: Outer Roll Diameter (mm) | ID: Inner Roll Diameter/Core Diameter (mm) |
| W: Machine width or roll length (mm) | $\rho$: Roll Density$\left(\frac{kg}{m^3}\right)$ |

The rolled sorbent sheet product may be wound to an average roll density of about 80-1500 kg/m$^3$, about 500-2000 kg/m$^3$, about 750-1500 kg/m$^3$, about 900-1200 kg/m$^3$, about 900-1050 kg/m$^3$, about 400-500 kg/m$^3$, about 500-600 kg/m$^3$, about 500-550 kg/m$^3$, about 600-650 kg/m$^3$, about 650-700 kg/m$^3$, and about 700-750 kg/m$^3$.

The rolled sorbent sheet product has a BWC greater than about 10 g/100 cm$^3$. In some embodiments, the rolled sorbent sheet product has a BWC of about 7.0 g/100 cm$^3$ to about 30 g/100 cm$^3$. The rolled sorbent sheet product may also have BWCs that are the same as the above described sorbent sheet products which are not rolled.

Similar to the discussion above with respect to the stacked sorbent material sheets, the wound or rolled sorbent material sheets may include multiple particle size distributions or populations of the adsorbent pelletized or powdered activated carbon. The same ratios are contemplated as discussed above. Similar to the discussion above, this results in greater performance because it enables a larger amount of the activated carbon to be incorporated into the sheets which are formed into the rolled sorbent sheet product.

As used herein, wound or rolled sorbent sheet products refer to any form of layering of one or more sorbent material sheets by winding, spiral winding, concentric layering of tubular (of any cross-sectional shape, for example round, elliptical, square, triangular, rectangle, etc.) or combination thereof. For example, a single sorbent material sheet may be spiral wound along its length to form a cylindrical-shaped rolled sorbent material sheet product. As another example, a plurality of sorbent material sheets can be stacked and then wound together to form a similar cylindrical shape. As another alternative, several sheets each formed into a cylinder having a slightly different diameter from the next can be arranged such that they from concentric rings in cross-section of a similarly sized cylinder. Various combinations of these and other arrangements may be used to fill the space within any shape of the article having an enclosed volume, as described elsewhere herein.

As used in the context of a wound or rolled sorbent material sheet or sheets, the term substantially parallel is used to mean that at a minute, infinitely small dimension, the two sheets or portions of the same sheets are the same distance from each other in all directions. However, it is also understood that in the context of the wound or rolled sorbent material sheets, especially those that are a single sheet wound in a spiral around a center or core, that this means that the sheets are not exactly the same distance apart from each other over the entire areas that face each other. Furthermore, it is understood that in this context, similar variations in distance are contemplated between the sheet or sheets due to components such as spacers, sensors, apertures, tubing, ports, valves, channels, corrugations, pleats, folds, deformation encountered during manufacturing or operation, deformation due to the shape or pressures applied by or through the external housing the walls or contents of the article having an enclosed volume, different wrapping techniques such as to seal the periphery of the sheets, and so forth.

Similar to the stacked sheet arrangement, the rolled sorbent sheet product has improved performance over the equivalent volume of activated carbon that is provided in pelletized or powdered form.

Performance improvements of the rolled sorbent material sheet product of the invention can be measured as the performance of the product having a given amount of activated carbon versus the performance of that same amount and grade of activated carbon if provided within a canister in a pelletized or powdered form. In some embodiments, the rolled sorbent sheet product has a BWC that is about 3% higher, about 5% higher, about 7% higher, about 9% higher, about 10% higher, about 12% higher, about 14% higher, and about 16% higher than the same amount and grade of activated carbon within a canister in pelletized or powdered form. Ranges based on these amounts are also contemplated, such as performance that is between about 5-14% higher, between about 5-10% higher, between about 10-16% higher, and so forth.

The sorbent material sheets in the sorbent material sheet product, may be configured as being flat, wound in a spiral cylinder, wound in an elliptical form, wound in an elongate rectangular bar, folded, laminated in an "S" shape, formed as concentric cylinders, formed as concentric ellipses, formed as a concentric rectangular bar, or as combinations of these forms.

In some embodiments, the sorbent material sheet product will comprise a single sorbent material sheet that is wound or rolled to achieve the desired characteristics including, but not limited to density, void space, pressure drop, capacity, etc.

Stacked Sorbent Material Sheet Product

The stacked sorbent material sheet product of the invention comprises two or more sorbent sheets each defining an upper surface and a lower surface, and having a known combined total surface area, wherein each sorbent sheet comprises a sorbent material and a binder; where adjacent sorbent sheets are stacked and arranged such that adjacent upper and lower surfaces are substantially congruent with each other, and aligned to allow fluid flow at least between adjacent upper and lower surfaces.

Performance improvements of the stacked sorbent material sheet product of the invention can be measured as the performance of the product having a given amount of activated carbon versus the performance of that same amount and grade of activated carbon if provided within a canister in a pelletized or powdered form. In some embodiments, the stacked sorbent sheet product has a BWC that is about 3% higher, about 5% higher, about 7% higher, about 9% higher, about 10% higher, about 12% higher, about 14% higher, and about 16% higher than the same volume and grade of activated carbon within a canister in pelletized or powdered form. Ranges based on these amounts are also contemplated, such as performance that is between about 5-14% higher, between about 5-10% higher, between about 10-16% higher, and so forth.

Articles Having Enclosed Volume

One or more of sorbent sheets or the sorbent material sheet product are positioned within one or more articles having enclosed volumes. The exact form and configuration of the sorbent material is not limited so long as at least a portion of the sorbent sheets, the sorbent material sheet product, or both are configured to come into contact with the gases found within the enclosed volume.

Similarly, the exact form and configuration of the article having an enclosed volume is also not limited, so long as the enclosed volume cannot be ventilated and is configured to allow one of the sorbent sheets or the sorbent material sheet product to contact the gases within the enclosed volume.

As used herein, the term "enclosed volume" is meant to encompass all known confined spaces wherein ventilation cannot occur. The enclosed volume does not need to contain a perfect seal, such as in cases requiring pressure equalization or in cases in which the article having the enclosed volume contains perforations, whether intentional or unintentional. For example, articles having enclosed volumes include, but are not limited to, cadaver pouches, film boxes, video tape boxes, and ammunition storage boxes.

The exact size of the enclosed volume is not limited. In one embodiment, the enclosed volume has a volume of about 0.5 m$^3$, about 1.0 m$^3$, about 1.5 m$^3$, about 2.0 m$^3$, about 2.5 m$^3$, about 3.0 m$^3$, about 3.5 m$^3$, about 4.0 m$^3$, about 4.5 m$^3$, or about 5.0 m$^3$, or any range of values for the volume that is formed from one or more of the above amounts.

Cadaver Pouch

The method of removing gases, which as described above in various embodiments, is in some embodiments used in cadaver pouches. In some embodiments, the preferred method of applying the sorbent sheet product is by welding the sheet to the walls of the cadaver pouch. In such embodiments, polymeric scrims are laminated to the surface of the sheet to allow for welding. In other embodiments, the sheet contains perforations. The perforations are to allow for the vapor to pass through the sheet to the adsorbent, as the sheet is hydrophobic in some embodiments.

The exact size of the cadaver pouch is not limited. In one embodiment, the cadaver pouch has an enclosed volume of about 0.5 m$^3$, about 1.0 m$^3$, about 1.5 m$^3$, about 2.0 m$^3$, about 2.5 m$^3$, about 3.0 m$^3$, about 3.5 m$^3$, about 4.0 m$^3$, about 4.5 m$^3$, or about 5.0 m$^3$, or any range of values for the volume that is formed from one or more of the above amounts. In another embodiment, the cadaver pouch is configured to contain an entire cadaver within the enclosed volume, while in another embodiment the cadaver pouch is configured to contain parts of a cadaver within the enclosed volume.

In use and in certain embodiments, the entire cadaver or parts of the cadaver described above are contaminated with one or contaminant substances. Similarly, an entire cadaver or parts of the cadaver can be suspected of being contaminated with one or more contaminated substances. The contaminant substances are not limited, and can include chemical or biological substances that would be harmful to personnel that handle the cadaver, parts of the cadaver, or the cadaver pouch. Examples of contaminant substances include nerve agents (including G-series, V-series, Novichok, carbamates, and insecticides), heavy metals (including lead, arsenic, cadmium, mercury, chromium, and thallium), toxic industrial chemicals (TICs), carcinogens, and radioactive materials.

The stacked sorbent sheet product has a BWC at least 10% higher than the BWC of a pelletized/powdered form of the same amount by volume of the sorbent material in the sorbent sheet. The stacked sorbent sheet product has a BWC greater than about 10 g/100 cm$^3$. The stacked sorbent sheet product has a BWC of about 7.0 g/100 cm$^3$ to about 30 g/100 cm$^3$, or greater than about 12 g/100 cm$^3$, or greater than about 13 g/100 cm$^3$, or greater than about 14 g/100 cm$^3$, or greater than about 15 g/100 cm$^3$, or greater than 20 g/100 cm$^3$. Ranges are also contemplated, such as about 10-20 g/100 cm$^3$, about 10-12 g/100 cm$^3$, about 10-14 g/100 cm$^3$, about 12-14 g/100 cm$^3$, about 12-15 g/100 cm$^3$, and about 15-20 g/100 cm$^3$.

In some embodiments, the stacked sheets are held in a spaced apart relationship which controls one or more of void volume, flow rate, pressure drop, and other characteristics. Such spacing is achieved in some embodiments where at least one of the two or more sorbent material sheets is corrugated. The spacing can also be achieved with various folds in the sheets, and can also be achieved by the corresponding raised and/or depressed portions of the sheets which are aligned to form gaps between the sheets. If the sheets are arranged deliberately so that the raised and/or depressed portions of the sheets do not nest between sheets, this results in additional spacing between the sheets and permits fluid flow in those portions. If the sheets are arranged deliberately so that at least some raised and/or depressed portions nest between sheets, this results in a tighter fitting stack of sheets and decreases the spacing between the sheets, with a corresponding decrease or even stop in fluid flow. Combinations of these features can be used to form stacked sorbent sheet products with directed regions or channels for fluid flow and barriers or edge seals. These features for fluid flow can also include holes, cuts, or apertures through one or more of the sheets in the stacked sorbent sheet product.

In some embodiments, the stacked sorbent material product yields a void volume of about 10% or more, about 12% or more, about 14% or more, about 15% or more, about 16% or more, about 17% or more, about 18% or more, about 19% or more, about 20% or more, about 21% or more, about 22% or more, about 23% or more, about 24% or more, about 25% or more, about 26% or more, about 27% or more, about 28% or more, about 29% or more, or about 30% or more, or any range formed by combining the above ranges. In some embodiments, the stacked sorbent material product yields a void volume of about 10%, about 12%, about 14%, about 15%, about 16%, about 17%, about 18%, about 19%, about 20%, about 21%, about 22%, about 23%, about 24%, about 25%, about 26%, about 27%, about 28%, about 29%, or about 30%, or any range formed by combining the above ranges. In some embodiments, the stacked sorbent material product yields a void volume of about 10-15%, about 15-20%, about 20-25%, about 25-30%, or about 30-35%.

In some embodiments, each sorbent sheet has a density of about 0.08 g/cm$^3$ to about 1.5 g/cm$^3$.

In some instances, the sorbent material sheet product comprises at least two populations of sorbent material particles, wherein each of the at least two populations have different average particle diameters. See the above description of the bimodal particle size distribution which was discussed with respect to the individual sorbent material sheets. The same distribution ratios as between populations of sorbent particles are contemplated with respect to product formed of multiple sorbent material sheets. In some instances, the density of the sorbent material particles achieved by the at least two populations is greater than the density achieved by either population alone. The inclusion of a bimodal particle size distribution can also be used to improve the mechanical properties of the sorbent material sheet product because it makes the polymeric sheets much more resistant to shear forces.

In some instances, a sorbent material sheet product comprises at least two sorbent material sheets, each of which has a defined upper surface and lower surface which have a combined total surface area, and wherein each sorbent material sheet comprises a sorbent material and a binder, and wherein each sorbent material sheet is stacked and arranged such that adjacent upper and lower surfaces of the separate sheets are substantially parallel and are aligned to allow fluid flow at least between the adjacent upper and lower surfaces.

The term substantially parallel as used in the context of a stacked sorbent material sheet product means that the sheets maintain the same distance apart over their entire area, but with exceptions made for various physical characteristics and features. These exceptions that still fall within the scope of substantially parallel include but are not limited to differences due to variations in components such as spacers, sensors, apertures, tubing, ports, valves, channels, corrugations, pleats, folds, deformation encountered during manufacturing or operation, deformation due to the shape or pressures applied by or through the walls or contents of the article having an enclosed volume, different wrapping techniques such as to seal the peripheries of the sheets, and so forth.

In some embodiments, the sorbent material sheet product has a BWC value about 5%, about 10%, about 15%, about 20%, about 25%, about 30%, about 35%, about 40%, about 45%, and about 50% higher than the BWC of the same volume of sorbent material in pelletized or powdered forms. These can also be combined to form ranges, for example, between about 5-25% higher. The invention also contemplates that these amounts are the endpoints on ranges, such as at least about 40% higher.

Wound/Rolled Sorbent Material Sheet Product

The sorbent material sheet product can also be wound or rolled as an alternative or in combination with stacked embodiments. A wound or rolled sorbent material sheet product comprises a sorbent sheet defining an upper surface and a lower surface, and combined has a known total surface area, wherein the sorbent sheet comprises a sorbent material and a binder where the sorbent sheet is spiral wound to create adjacent sheet layers which allow fluid flow around and between adjacent sheet layers.

Additional Embodiments

Additional embodiments are also contemplated. In one embodiment, the form of the sorbent material sheet product is a rolled sheet that includes a sorbent material sheet. In another embodiment, the form of the sorbent material sheet product is a shredded sheet that includes shredded strips of the sorbent material sheet. In another embodiment, the form of the sorbent material sheet product is cut sheets of the sorbent material sheet in various shapes. When the sheets are shredded or cut, the x and y dimensions of the sheet are larger than the thickness of the sheet.

In still other embodiments, the form of the sorbent is not as a sheet product, but is instead strands of binder and sorbent material. The strands may be individual, woven, non-woven, or in other forms including rope or yarn. These forms can be achieved by fibrillating the binder with the sorbent to as to form thin strands which are then combined into other forms.

The rolled sheets are typically made by winding the sheets around a solid, central, cylindrical spindle. This is some solid polymer or other material. The spindle is solid and takes up volume. In other instances, the sheet is wound about an open central core, such as a rigid or semi-rigid tube. In either case, the center does not contribute to the performance of the sorbent device. This application is directed toward putting that central core to good use. The activated carbon sheet is wound around an adsorptive core material producing a spiral wound device with additional adsorptive capacity.

The center core is fabricated from sorbent material or as a structure that would serve as a core with internal volume filled with sorbent material. The advantage of this would be to increase the amount of adsorbent within the device, thereby increasing performance. The central core could take the form of an open space, a hollow tube, a perforated hollow tube, or other structure used to define a space which holds additional sorbent material. The increase in sorbent material should result in even better performance.

The center core may include not only the sheets described above, but also the other forms of the sorbent material, such as the cut or shredded sheets, rope, yarn, and the like.

Another improvement relates to improving flow between the spiral wound sheet or sheets. Winding of carbon sheets into spirals to form an adsorber was accomplished by controlling the tension of the winding process. Because the sheets are flexible and of low tensile strength, this sometimes leads to adsorbers where the spacing between the wound sheets was inconsistent, difficult to control or non-existent. In these embodiments, flexible carbon sheets can for example, be deflected by the action of a human technician, installer, or assembler, or can even be deflected by forces present in anticipated operating environments. The use of spacers, for example in the form of woven or non-woven, netting or other fabric or incorporating particles into the sheet whose diameter is larger than the sheet thickness leads to higher tensile strength material with pre-defined spacing between wound layers. The sheet could also be perforated to overcome issues with inconsistent winding spacing by providing a pathway between wound layers preventing blinding off of carbon and by-pass.

A biplanar spacer can be incorporated into the spiral wound adsorber during the winding process. A separate biplanar spacer, made from either a polymer, fabric, metal, carbon fiber or activated carbon fiber or combinations thereof would be wound with the carbon sheet to form the final assembly. The spacer could be of different thicknesses to control the size and pressure drop across the adsorber. The orientation of the spacer could be used to control the flow of the fluid in a path that is not necessarily the shortest distance increasing the fluid carbon contact time. This would also increase the tensile strength of the unit.

In some embodiments, the spacer can be a non-woven porous material. Non-woven porous materials could be incorporated into the wound structure that would allow uniform spacing with a controlled pressure drop. Tensile strength would also be improved.

To increase the tensile strength of the carbon sheet, a polymer or fibrous netting could be incorporated into the carbon sheet during the roll milling process. The netting could be of various configurations and thicknesses depending on the desired properties of the final sheet. The goal is to increase the tensile strength of the material allowing for more reliable winding to maintain separation and ease of manufacture.

Some embodiments achieve similar results by incorporating perforated sheets. The wound sorbent sheets could be perforated before winding so that imperfections in the winding process would be mitigated and provide for alternate pathways for fluid flow through the adsorber.

Rather than woven or non-woven materials, granular or pelleted activated carbon could be used as a spacer. Activated carbon or some other rigid granular material, preferably a sorbent material, can be added to the carbon sheet either before or after milling to serve as the spacer and to add adsorptive capabilities.

Any of these spacers could be used with stacked sheets as well as wound sheets with the same advantages. In either structure, the space creates uniform spacing. Texture such as corrugation or other surface features could also be employed to achieve the desired characteristics and flow.

In some embodiments, the various components such as sorbent material sheets, spacers, woven and/or non-woven materials, perforated or non-perforated sheets, additional sorbent material, and other components may be rolled in alternating fashion, which is sometimes referred to as a "jelly roll" structure as the alternating components remain parallel with each other and spiral around a core in repeating bands. This embodiment is most useful for embedding spacers or other pleated, textured, or corrugated components between sorbent sheets to precisely control the spacing in between the sheets and therefore pressure drop and performance. In still further embodiments, the components may be co-nested within each other as tubes and not wound in a spiral.

Figure 2:
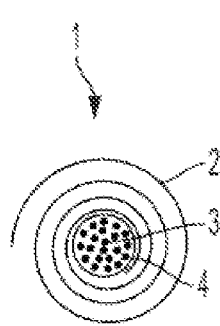
FIG. 2 depicts a further embodiment of the invention utilizing a sorbent core.

Various embodiments are shown in the Figures. FIG. 1 shows the improvement of including sorbent within a central core of wound sorbent material sheets. In FIG. 1, the wound sorbent material sheet 1 is depicted as including sorbent material sheet 2 which is wrapped around a central core of sorbent 3. In another embodiment, FIG. 2 depicts a wound sorbent material sheet 1 that includes sorbent material sheet 2, again wrapped around central core of sorbent 3. However, the embodiment of FIG. 2 further includes a tube 4 or other similar structure that surrounds the sorbent 3. The tube 4 may include perforations, tears, apertures, or other similar features (not shown) to permit at least some gas or vapor to pass between the sorbent contained in the central core and the sorbent sheet material in the outer portion.

Figure 3:
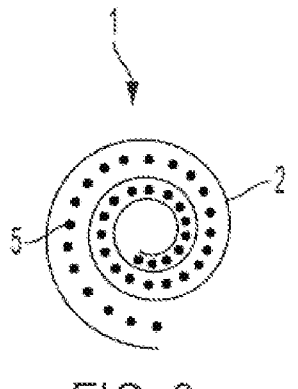
FIG. 3 depicts a further embodiment of the invention utilizing spacers.
Figure 4:
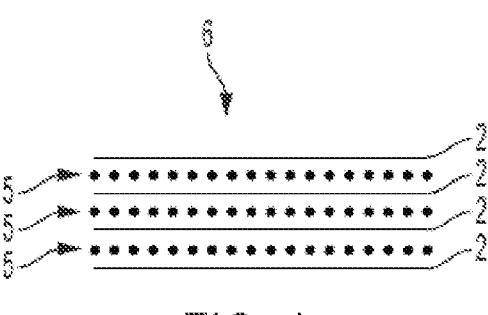
FIG. 4 depicts a further embodiment of the invention utilizing spacers.

In still further embodiments, FIG. 3 depicts a wound sorbent material sheet 1 that includes sorbent material sheet 2, and further includes a spacer 5 that is included to precisely control the spacing and therefore pressure drop and other performance characteristics of the wound sheets. FIG. 4 depicts an additional embodiment, where stacked sorbent material sheet 6 includes several stacked sorbent material sheets 2. In between each pair of sorbent material sheets 2 is a spacer 5 that is used to precisely control the spacing and therefore pressure drop and other performance characteristics of the stacked sheets.

In some instances, the sorbent material sheet product may be directly applied to a surface, for example a wall, or may be selectively cured at the outer sheets so that a durable, cured shell forms that acts as a support for the rolled or folded sorbent sheets within. Such selective curing can be accomplished thermally or with a chemical bath, or via actinic radiation, such as ultraviolet light or by electron beam curing.

In embodiments where the sorbent material sheets omit a housing they may be contained within the space where capture is required, such as the cadaver pouch or other articles having an enclosed volume, the sorbent material sheets may be attached to these parts in a variety of ways. In some embodiments, the sheets are heat staked into the desired position and location. In some embodiments, the sorbent material sheets can be fastened using mechanical fasteners such as screws, rivets, or clamps, or the sorbent material sheets may be fastened using an adhesive backing. The adhesive backing may be a single layer of adhesive or a double-sided adhesive tape or sheet. The adhesive used in the adhesive backing may include pressure sensitive adhesives, UV curing adhesives, thermally curing adhesives, hot melt adhesives, and reactive multi-part adhesives. Adhesive compositions include acrylic and (meth)acrylic, acrylate and (meth)acrylate, epoxies in one- and two-part formulations, and urethane.

EXAMPLES

To demonstrate hydrocarbon adsorption advantages vs. prior art products tests were carried out with butane as follows:

Test Setup:

Airtight box contains injection port and port for butane detection sensor

Sensor remains inside box during test and is zeroed out prior to starting test 1.25 ml of butane is injected into the box using a syringe Sample is placed into the box once 1000 ppm level is detected Timer is started once test sample is placed in box Measurements are taken at 5 min intervals for first 30 minutes and then every 10 minutes, until end of test (20 minutes, or until 0 ppm of butane is read).

Figure 5:
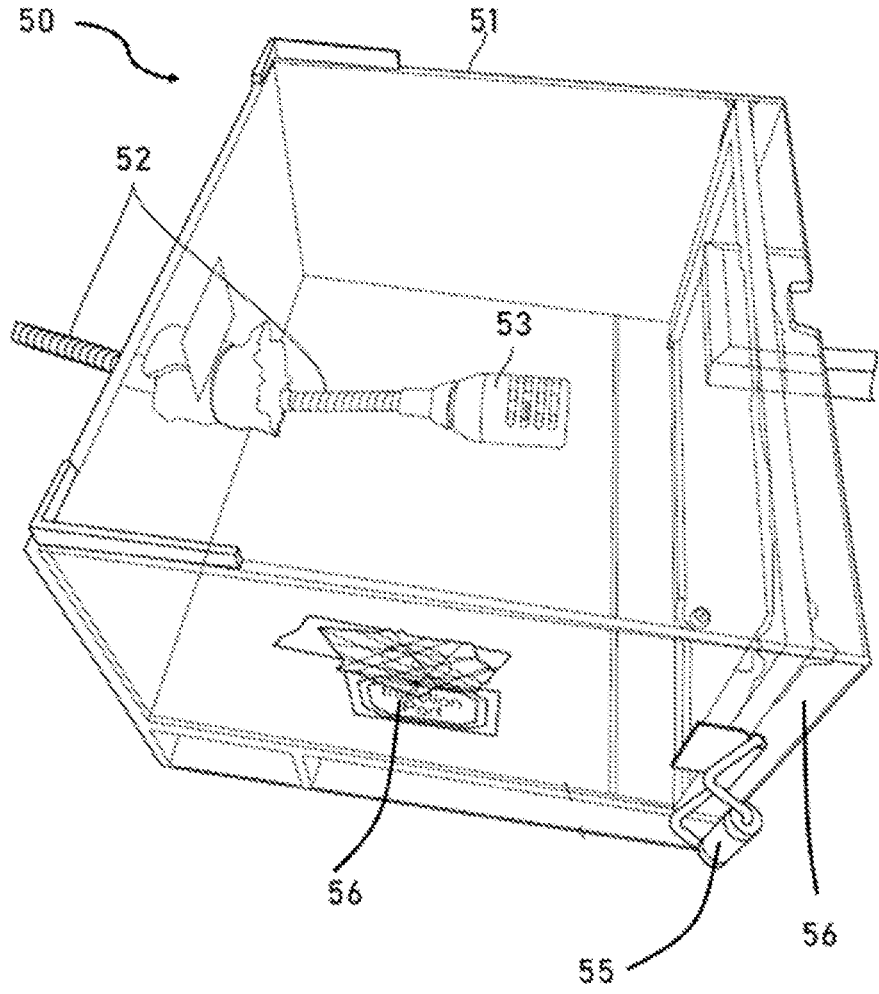
FIG. 5 depicts the test setup of an embodiment of the disclosure.

The test setup is illustrated in FIG. 5. According to FIG. 5, a test apparatus 50 is depicted. The test apparatus 50 includes a clear acrylic box 51, one wall of which has a hole where sensor arm 52 is inserted with appropriate sealing and packing material to ensure that no gas can escape from the clear acrylic box 51. Inside the clear acrylic box 51, the sensor arm suspends a butane sensor 53 that detects the level of butane contained within the clear acrylic box 51. An injection port 56 is also present so that butane or other gases can be added. Samples (not shown) are placed inside the apparatus 50 by opening the door 54 by way of handle 55.

Figure 6:
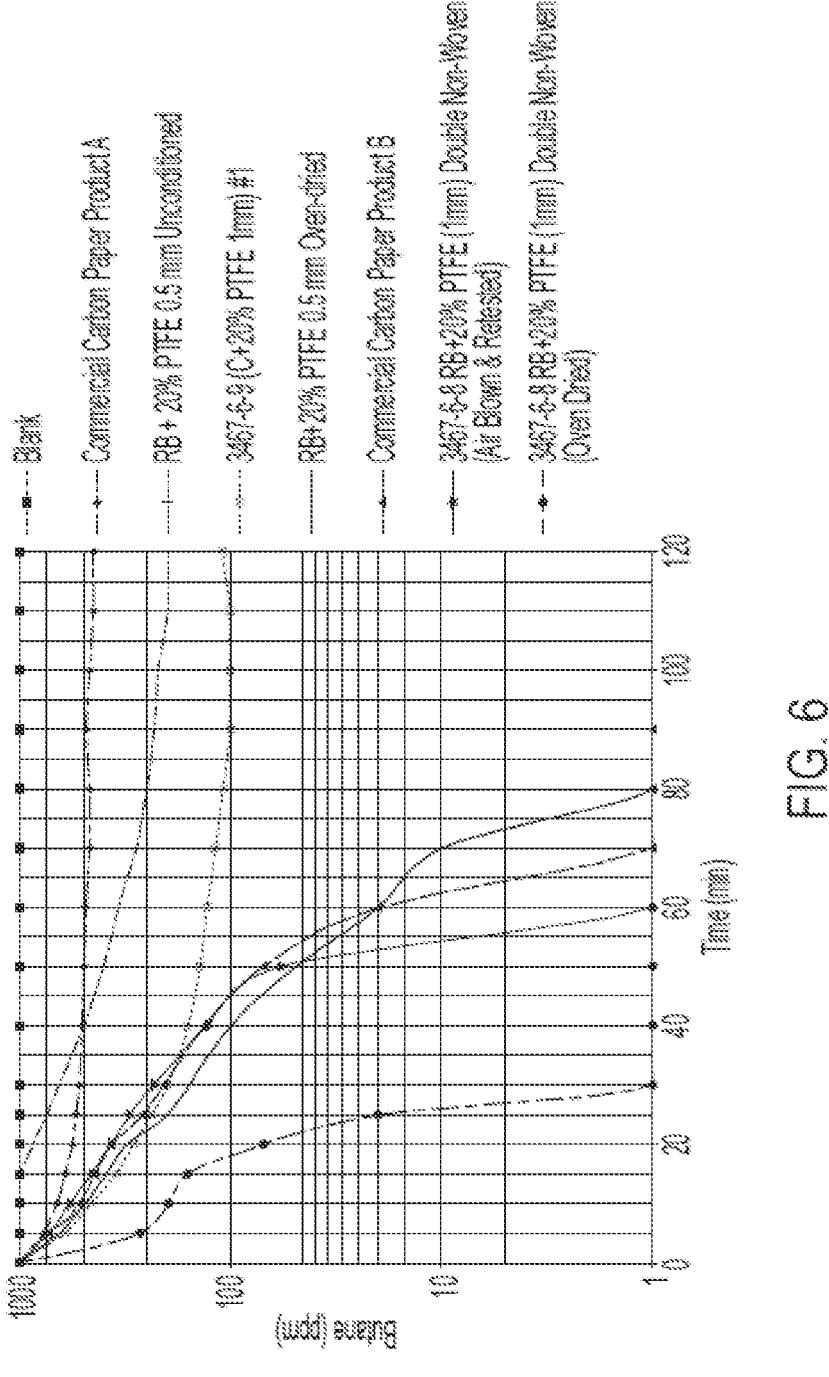
FIG. 6 depicts the test results of an embodiment of the disclosure.

The sorbent material sheets were formed by blending powdered activated carbon and a PTFE binder. The binder was blended in the amount of 11 wt. %. The powdered activated carbon is available from Calgon Carbon Corporation by the product name "RB" and is a coal based activated carbon having a gravimetric iodine number of at least 1070 mg/g. Such sorbent material sheets were shown to reach non-detectable levels of butane more quickly than any other product tested as depicted in FIG. 6. FIG. 6 shows the amount of butane, measured in parts per million (ppm) over time measured in minutes (min) for several samples that were tested in a test apparatus 50 depicted in FIG. 5. Note that in FIG. 6, the amount of measured butane is logarithmic.

The devices of various embodiments may include a housing and the sorbent material sheets described above. The housing may be any shape and can be configured for purifying gases. For example, in some embodiments, the housing may be any shape such as, for example, cuboidal, cubic, or cylindrical. The sorbent material sheets may be sized to fit within the housing and substantially fill a space within the housing through which the gas or liquid is passed. In some embodiments, two or more sorbent material sheets may be stacked to substantially fill the housing, and in other embodiments, the sorbent material sheets may be rolled to form a spiral wound sheet or pressed to form a stacked sheet. In some embodiments, the stacked or pressed sheets may be such that the sides of adjoining sheets are substantially contiguous. In other embodiments, stacked or pressed sheets may be positioned such that adjoining sheets are spaced. For example, in certain embodiments, the sheets may be corrugated, having sorbent material sheets that form a series or parallel ridges and furrows, and in some embodiments, corrugated sorbent material sheets may be separated by flat sorbent material sheets. The corrugated sorbent material sheets may be disposed within the housing in a stacked or rolled/spiral wound form.

In various embodiments, the void fraction may be about 30% to about 32% less than the void volume for current devices, and in some embodiments, the void fraction may be as low as about 10%. For example, the devices may have a void fraction of about 45% to about 10%, about 35% to about 10%, about 25% to about 10%, or any individual void fraction or range encompassed by these example ranges. The devices of various embodiments may exhibit less flow restriction, for example pressure drop, than devices having granular or pelleted sorbent materials. Thus, more adsorbent material can be incorporated into such devices without reducing the flow rate of the device.

The devices of such embodiments may have BWCs of greater than about 5.0 g/100 cm$^3$, and in some embodiments, the devices may have a BWC of about 4.0 g/100 cm$^3$ to about 20 g/100 cm$^3$, 5.0 g/100 cm$^3$ to about 18 g/100 cm$^3$, about 7.0 g/100 cm$^3$ to about 16 g/100 cm$^3$, or about 8.0 g/100 cm$^3$ to about 15 g/100 cm$^3$, or any individual BWC or range encompassed by these example ranges. The devices may exhibit a pressure drop that is at most equal to a conventional dense pack bed of powders, pellets, or granules of activated carbon or other activated compounds. This feature is advantageous because it ensures that the inventive sorbent material sheet product, whether stacked, rolled, wound, or otherwise configured, still has the same ability to process and transfer gases and gases as conventional devices, despite the increased sorbent performance.

In some embodiments, an article having an enclosed volume may be provided with integral vapor adsorption. Such spaces comprised a confined container and at least one sorbent material product placed within the container.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

What is claimed is:

1. A method of adsorbing vapors in an article having an enclosed volume, the method comprising:

providing in the enclosed volume a sorbent material sheet product; and contacting the vapors with the sorbent material sheet product, wherein the sorbent material sheet product comprises:

a sorbent material and a binder that holds the sorbent material in place, and one or more polymeric scrims laminated to a surface of the sorbent material and the binder, and wherein the article having an enclosed volume is one of a cadaver pouch, a box containing film, a box containing video tapes, or a box containing ammunition.

2. The method of adsorbing vapors of claim 1, wherein the sorbent material is selected from the group consisting of activated carbon, carbon nanotubes, graphenes, natural and synthetic zeolite, silica, silica gel, alumina, zirconia, diatomaceous earths, and combinations thereof.

3. The method of adsorbing vapors of claim 1, wherein the binder comprises one or more of polytetrafluoroethylenes (PTFE or TEFLON), polyvinyl fluorides or polyvinylidene fluorides (PVF or $PVF_2$ or PVDF), ethylene-propylene-diene (EPDM) rubbers, polyethylene oxides (PEO), UV curable acrylates, UV curable methacrylates, heat curable divinyl ethers, polybutylene terephthalate, acetal or polyoxymethylene resin, fluoroelastomers, perfluoroelastomers (FFKM) and/or tetrafluoro ethylene/propylene rubbers (FEPM), aramid polymers, para-aramid polymers, meta-aramid polymers, poly trimethylene terephthalate, ethylene acrylic elastomers, polyimide, polyamide-imides, polyurethanes, low density and high density polyethylene, polypropylene, biaxially oriented polypropylene (BoPP), polyethylene terephthalate (PET), biaxially oriented polyethylene terephthale (BoPET), polychloroprene, or copolymers or combinations thereof.

4. The method of adsorbing vapors of claim 3, wherein the binder is hydrophobic.

5. The method of adsorbing vapors of claim 1, wherein the sorbent material sheet product is flexible.

6. The method of adsorbing vapors of claim 1, wherein the one or more polymeric scrims allow the sorbent material sheet product to be welded with one or more plastics.

7. The method of adsorbing vapors of claim 1, wherein the one or more polymeric scrims allow the sorbent material sheet product to be sewn together.

8. The method of adsorbing vapors of claim 1, wherein the sorbent material sheet product contains perforations allowing fluids to pass through the sorbent material into an adsorbent layer.

9. The method of adsorbing vapors of claim 1, wherein the sorbent material is present on a surface of the sorbent material sheet product.

10. The method of adsorbing vapors of claim 1, wherein the article having an enclosed volume is a cadaver pouch that contains a cadaver or a part of a cadaver that is contaminated with at least one contaminant substance.

11. The method of adsorbing vapors of claim 1, wherein the article having an enclosed volume is a cadaver pouch that contains a cadaver or a part of a cadaver that is suspected of being contaminated with at least one contaminant substance.

12. The method of adsorbing vapors of claim 1, wherein the binder is fibrillated.

* * * * *